Patented Feb. 16, 1926.

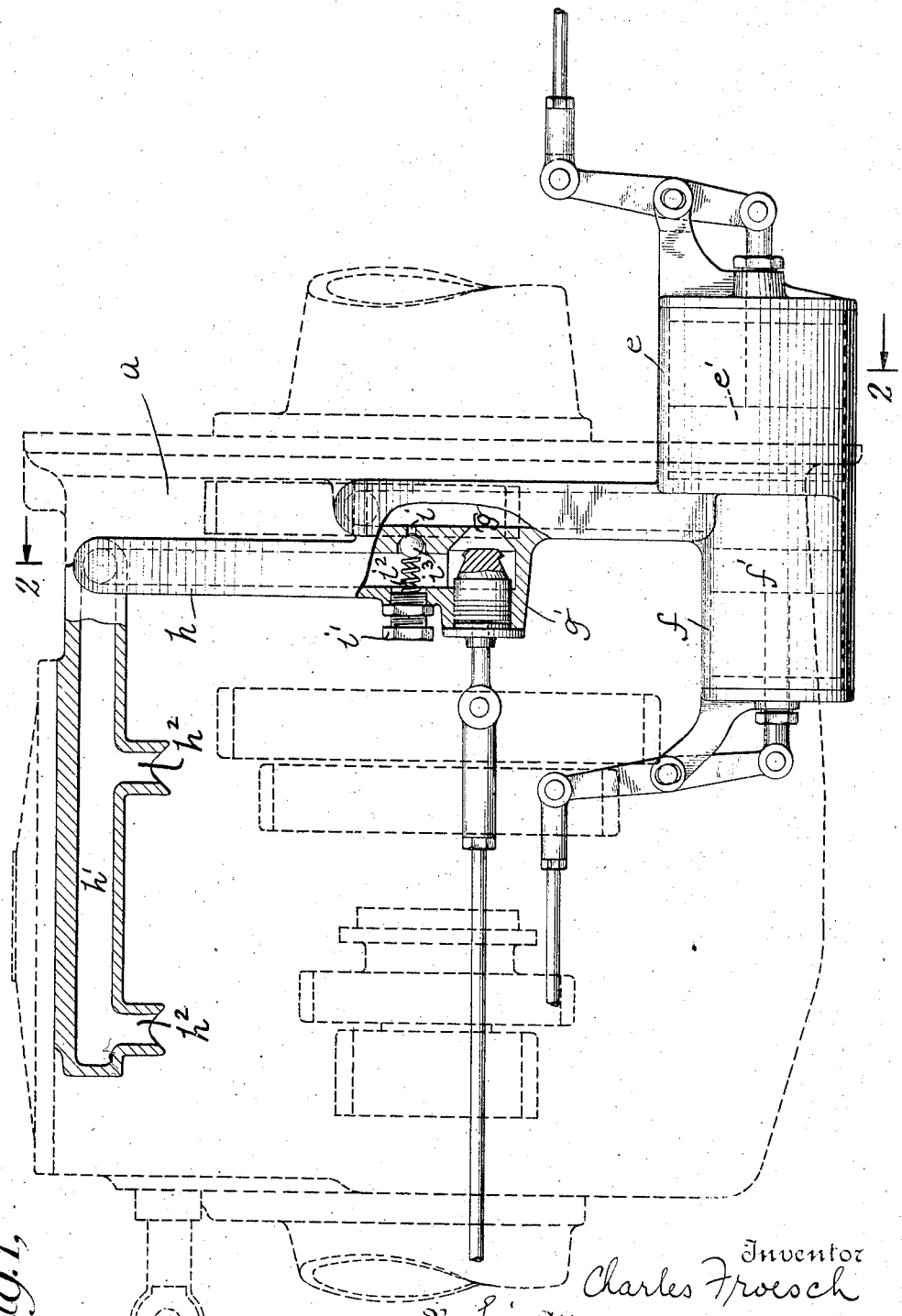

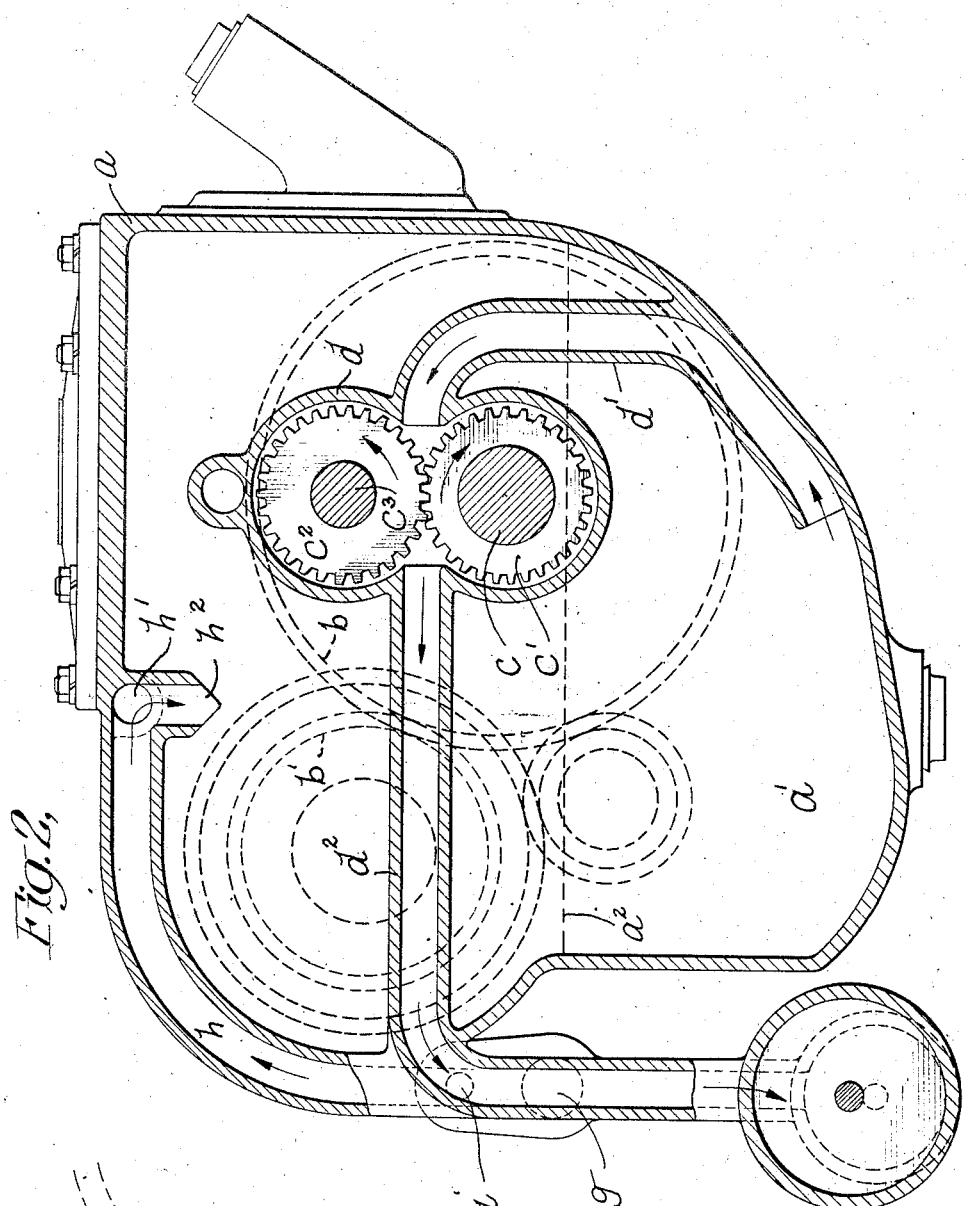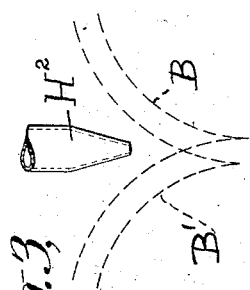

1,572,890

UNITED STATES PATENT OFFICE.

CHARLES FROESCH, OF NEW YORK, N. Y., ASSIGNOR TO INTERNATIONAL MOTOR COMPANY, OF NEW YORK, N. Y., A CORPORATION OF DELAWARE.

BRAKE SYSTEM.

Application filed March 21, 1924. Serial No. 700,757.

*To all whom it may concern:*

Be it known that I, CHARLES FROESCH, a citizen of the United States, residing in the borough of Manhattan, of the city of New York, in the State of New York, have invented certain new and useful Improvements in Brake Systems, of which the following is a specification, reference being had to the accompanying drawings, forming a part hereof.

This invention relates to brake operating mechanism and more particularly to brake operating mechanism for motor vehicles actuated by fluid pressure. It has heretofore been proposed to actuate brake mechanism by fluid pressure through the operation of a pump driven from a moving part of the vehicle and constantly drawing fluid from a reservoir and returning the fluid to the reservoir except when the brakes are to be operated when the flow of fluid from the pump is diverted to the brake operating mechanism. The present invention seeks to incorporate such a system with existing units of a motor vehicle in the interest of economy of space and a reduction in the number of parts. Accordingly the pump is incorporated with the change speed gearing in the transmission housing and the housing is utilized as the reservoir for the fluid. The invention also seeks to utilize the aforesaid relation of parts to provide a positive lubricating system for the transmission. Accordingly a lubricating medium is employed as the fluid and the pump and its associated parts are so disposed that the lubricating medium which is constantly returned to the reservoir when the brake operating mechanism is not functioning, is directed upon the various moving parts of the transmission, effecting their lubrication. These and other objects of the invention will be apparent from the following description of a preferred embodiment of the invention illustrated in the accompanying drawings. In the drawings:

Figure 1 is a view representing somewhat schematically the transmission housing and change speed gears of a motor vehicle and showing the incorporation of fluid pressure actuating mechanism for the brake operating devices.

Figure 2 is a view taken in the planes indicated by the broken line 2—2 in Figure 1, looking in the direction of the arrows and showing the pump and passages for withdrawing the oil from the reservoir and directing it as desired either to the change speed gears or to pressure cylinders actuating the brakes.

Figure 3 is a fragmentary view showing a nozzle which may be used to direct the lubricating medium upon the enmeshing teeth of change speed gears.

In the drawings the transmission housing and the change speed gears have been shown in outline as the invention is not limited to any particular type of transmission and only so much of the same has been illustrated as is necessary to an understanding of the invention. The transmission housing is indicated at $a$ and a pair of intermeshing change speed gears at $b$, $b'$, the gear $b$ being shown as mounted upon the transmission shaft $c$ of the transmission which is constantly turning whenever the vehicle is in motion. The lower part of the transmission housing $a$ is so formed as to provide a reservoir $a'$ of considerable volumetric capacity, the normal height of the lubricating medium therein being indicated by the dotted line $a^2$. Mounted upon the transmission shaft $c$ and keyed or otherwise rigidly secured thereto is one of a pair of intermeshing gears $c'$, $c^2$ forming the pump of the present invention, the stub shaft $c^3$ carrying the co-operating gear $c^2$ being journaled in any convenient manner in a housing $d$ which may form a part of or be secured to an end wall of the transmission housing. Leading from a low point in the reservoir $a$ is a conduit $d'$ serving as an intake for the pump, the liquid being drawn from the reservoir through the conduit $d'$ under the action of the pump whenever the transmission shaft $c$ rotates and being delivered by the pump into an outlet conduit $d^2$. The conduit $d^2$ leads directly to a pair of fluid pressure cylinders $e$ and $f$ containing pistons $e'$, $f'$, respectively, the piston rods of which are connected in the illustrated embodiment by a series of levers and links with the brake operating mechanism (not shown) at the rear and front wheels of the vehicle. Pistons $e'$, $f'$, may be of the same or different cross sectional areas depending upon whether the same or a different degree of braking power is to be transmitted to the front and rear wheels. An orifice $g$ in the wall of the conduit $d^2$ provides an outlet for the lubricating medium into a by-pass $h$ to the reservoir $a'$. It is preferred that by-pass $h$ be so disposed as to conduct the lubricating medium to the upper portion of the housing $a$ where it terminates in a passage $h'$ having a plurality of outlets $h^2$ to permit the lubricating medium to fall upon the gears. If desired the outlets $h^2$ may take the form of a nozzle $H^2$ (Figure 3) discharging the lubricating medium directly upon the point where the teeth of co-operating gears B, B' enmesh.

The pump will operate continuously whenever the transmission shaft is turning and fluid will be pumped to the cylinders $e$ and $f$. Ordinarily, however, the reaction of the pistons $e'$, $f'$ will be sufficient, due to their connections with the brake operating mechanism to set up an appreciable degree of back pressure against the pump. This will cause the fluid in the conduit $d^2$ to take the easiest path and to flow through the outlet $g$ into the by-pass $h$ for return to the reservoir. When, however, it is desired to operate the brakes, orifice $g$ may be closed by means of valve $g'$ actuated in any convenient manner as by a foot pedal or the like (not shown) from the driver's seat. It will be apparent that when the orifice $g$ is closed by the valve $g'$ all of the fluid will be pumped to the cylinders $e$ and $f$. In order to regulate the application of braking power to the brake drums and prevent the binding of the brakes which would build up a back pressure in the conduit $d^2$, a check valve $i$ is provided in the wall thereof opening into the bypass $h$. The point at which the valve operates to reduce the pressure in the cylinders being regulated by any convenient regulating device, in the present instance, a plug $i'$ determining the compression of the spring $i^2$ bearing upon the ball $i^3$.

It will be obvious that the fluid pressure cylinders actuating the brake operating mechanism need not be disposed in close proximity to the transmission housing but equivalent results may be obtained by dividing the conduit $d^2$ and conducting the fluid to pressure cylinders located at the respective wheels of the vehicle.

Various modifications may be made in the arrangement and disposition of the co-operating parts and no limitation is intended by the foregoing description except as indicated in the appended claims.

What I claim is:—

1. The combination with a transmission housing and change speed gears, of a reservoir formed in the housing and a pump to draw fluid from the reservoir and discharge it upon the interchangeable surfaces of the gears.

2. The combination with change speed gears and a housing therefor, of a reservoir formed in the bottom of the housing, a pump, means to conduct fluid from the reservoir to the pump and means to conduct fluid from the pump to the interchangeable surfaces of the gears.

3. The combination with a transmission housing and fluid pressure brake operating mechanism, of a reservoir formed in the housing, a pump to draw fluid from the reservoir and direct it to the brake operating mechanism and the interengaging surfaces of the gears.

4. The combination with a transmission housing and brake operating mechanism, of a reservoir formed in the housing, a pump, a fluid pressure cylinder having a piston, means to conduct fluid from the reservoir to the pump, means to conduct fluid from the pump to the cylinder and the interengaging surfaces of the gears, and connections between the piston and the brake operating mechanism.

5. The combination with a transmission housing, change speed gears and a transmission shaft in said housing and fluid pressure brake operating mechanism, of a reservoir formed in the housing, a pump actuated by the transmission shaft, means to conduct fluid from the reservoir to the pump, means to conduct fluid from the pump to the fluid pressure brake operating mechanism, and a by-pass for the fluid from the pump to the gears.

6. The combination with a transmission housing, change speed gears and a transmission shaft in the housing and brake operating mechanism, of a reservoir formed in the housing, a pump actuated by the transmission shaft, a fluid pressure cylinder, a conduit to conduct fluid from the reservoir to the pump, a conduit to conduct fluid from the pump to the cylinder and connections between the cylinder and the interengaging surfaces of the gears and the brake operating mechanism.

7. The combination with a transmission housing, change speed gears and a transmission shaft in the housing and brake operating mechanism, of a reservoir formed in the housing, a pump actuated by the transmission shaft, a fluid pressure cylinder, a conduit to conduct fluid from the reservoir to the pump, a conduit to conduct fluid from the pump to the cylinder, a by-pass from the pump to the reservoir through the interengaging surfaces of the gears and connections between the cylinder and the brake operating mechanism.

8. The combination with a transmission housing, change speed gears and a transmission shaft in the housing and brake operating mechanism, of a reservoir formed in the housing, a pump actuated by the transmission shaft, a fluid pressure cylinder, a conduit to conduct a lubricant from the reservoir to the pump, a conduit to conduct lubricant from the pump to the cylinder, a by-pass directing lubricant on the gears and connections between the cylinder and the brake operating mechanism.

9. The combination with a transmission housing, change speed gears and a transmission shaft in the housing and brake operating mechanism, of a reservoir formed in the housing, a pump actuated by the transmission shaft, a fluid pressure cylinder, a conduit to conduct lubricant from the reservoir to the pump, a conduit to conduct lubricant from the pump to the cylinder, a by-pass, means to control the flow of lubricant to the by-pass and connections between the cylinder and the brake operating mechanism.

10. The combination with a transmission housing, change speed gears and a transmission shaft in the housing and brake operating mechanism, of a reservoir formed in the housing, a pump actuated by the transmission shaft, a fluid pressure cylinder having a piston, a conduit to conduct lubricant from the reservoir to the pump, a conduit to conduct lubricant from the pump to the cylinder, a by-pass leading from the last mentioned conduit to the reservoir, a valve to control the flow of lubricant to the by-pass, a check valve between the last mentioned conduit and the by-pass, and connections between the piston and the brake operating mechanism.

11. In a motor vehicle, the combination with a transmission housing, change speed gears and a transmission shaft in the housing, front wheel brake operating mechanism and rear wheel brake operating mechanism, of a reservoir formed in the bottom of the housing, a pump actuated by the transmission shaft, a fluid pressure cylinder having a piston of major diameter, connections between said piston and the rear wheel brake operating mechanism, a second fluid pressure cylinder having a piston of minor diameter, connections between said last named piston and the front wheel brake operating mechanism, a conduit between the reservoir and the pump, a conduit between the pump and the two cylinders, a distributing conduit in the upper part of the housing, nozzles formed in the distributing conduit to direct lubricant upon the gears, a by-pass between the second mentioned conduit and the distributing conduit, a manually operable valve controlling the flow of lubricant from the second mentioned conduit to the by-pass and a check valve between said second mentioned conduit and the by-pass.

12. The combination with a transmission housing and remote actuating mechanism, of a reservoir formed in the housing, a pump and fluid pressure cylinder having a piston, means to conduct fluid from the reservoir to the pump, means to conduct fluid from the pump to the cylinder and the interengaging surfaces of the gears, and connections between the piston and the actuating mechanism.

13. The combination with a transmission housing and remote fluid pressure actuating mechanism, of a reservoir formed in the housing, a pump to draw fluid from the reservoir and direct it to the remote actuating mechanism and the interengaging surfaces of the gears.

14. The combination with change speed gears and a housing therefor, of a reservoir, a pump, means to conduct fluid from the reservoir to the pump, and means to conduct fluid from the pump to the interengaging surfaces of the gears.

15. The combination with a transmission housing and fluid pressure brake operating mechanism, of a reservoir, a pump to draw fluid from the reservoir and direct it to the brake operating mechanism and means to by-pass the fluid to the interengaging surfaces of the gears.

16. The combination with change speed gears and a housing therefor, of a reservoir, relatively remote actuating mechanism, a pump to draw fluid from the reservoir and direct it to the relatively remote actuating mechanism and means to by-pass the fluid to the interengaging surfaces of the gears.

17. The combination with a transmission housing and relatively remote actuating mechanism, of a reservoir, a pump, a fluid pressure cylinder having a piston, means to conduct fluid from the reservoir to the pump, means to conduct fluid from the pump to the cylinder, and connections between the piston and the relatively remote actuating mechanism and means to by-pass the fluid to the interengaging surfaces of the gears.

18. The combination of a transmission housing and a relatively remote actuating mechanism of a reservoir, a pump, means to conduct fluid from the reservoir to the pump and means to conduct fluid selectively to the remote actuating mechanism and to the interengaging surfaces of the gears.

19. The combination of a transmission housing and a relatively remote actuating mechanism of a reservoir, a pump, means to conduct fluid from the reservoir to the pump, means to selectively conduct fluid from the pump to the remote mechanism and the interengaging surfaces of the gears and means to prevent excess pressure between the pump and the remote mechanism.

20. The combination of a transmission housing and a relatively remote actuating mechanism, of a reservoir, a pump, means to conduct fluid from the reservoir to the pump, means to selectively conduct fluid from the pump to the remote mechanism and the interengaging surfaces of the gears and means for limiting the pressure between the pump and remote mechanism including means to conduct fluid to the gears.

This specification signed this 17th day of March, A. D. 1924.

CHARLES FROESCH.